US007524146B2

(12) United States Patent
Peet

(10) Patent No.: US 7,524,146 B2
(45) Date of Patent: Apr. 28, 2009

(54) PNEUMATIC UNEVEN FLOW FACTORING FOR PARTICULATE MATTER DISTRIBUTION SYSTEM

(76) Inventor: William Jeffrey Peet, 116 Highman Ave., Cambridge (CA) N1R 3L7

( * ) Notice: Subject to any disclaimer, the term of this patent is extended or adjusted under 35 U.S.C. 154(b) by 225 days.

(21) Appl. No.: 11/565,137

(22) Filed: Nov. 30, 2006

(65) Prior Publication Data

US 2008/0131213 A1 Jun. 5, 2008

(51) Int. Cl.
*B65G 53/00* (2006.01)

(52) U.S. Cl. .......................... 406/198; 406/10; 406/14; 406/19

(58) Field of Classification Search ................. 110/265; 406/10, 11, 12, 14, 19, 93–95, 155, 170, 406/181, 194, 197, 198

See application file for complete search history.

(56) References Cited

U.S. PATENT DOCUMENTS

| | | | | |
|---|---|---|---|---|
| 4,177,951 | A * | 12/1979 | Makuch | 241/35 |
| 4,270,558 | A | 6/1981 | Forster et al. | |
| 4,275,601 | A * | 6/1981 | Macko | 73/861.04 |
| 4,490,077 | A * | 12/1984 | Shimada et al. | 406/14 |
| 4,501,156 | A | 2/1985 | Kretschmer et al. | |
| 4,529,336 | A * | 7/1985 | Shinozaki et al. | 406/14 |
| 4,594,028 | A | 6/1986 | Ulveling | |
| 4,758,117 | A | 7/1988 | Maki et al. | |
| 4,758,118 | A * | 7/1988 | Rachner et al. | 406/24 |
| 4,791,817 | A | 12/1988 | Albertz et al. | |
| 4,830,287 | A | 5/1989 | Kim | |
| 4,830,545 | A | 5/1989 | Salter et al. | |
| 4,834,588 | A * | 5/1989 | Salter et al. | 406/14 |
| 4,838,738 | A * | 6/1989 | Salter et al. | 406/14 |
| 4,844,663 | A * | 7/1989 | Salter et al. | 406/19 |
| 4,903,901 | A | 2/1990 | Kim et al. | |
| 4,932,594 | A * | 6/1990 | Kim | 241/19 |
| 4,936,870 | A | 6/1990 | Baumann et al. | |
| 5,048,761 | A | 9/1991 | Kim | |
| 5,132,917 | A * | 7/1992 | Bass | 702/45 |
| 5,143,485 | A | 9/1992 | Faas et al. | |
| 5,240,355 | A | 8/1993 | Hudalla | |
| 5,584,612 | A | 12/1996 | Nolan | |
| 5,908,990 | A * | 6/1999 | Cummings | 73/861.22 |
| 6,386,800 | B1 | 5/2002 | van Eyck | |
| 2005/0265793 | A1 | 12/2005 | Van Mullekom et al. | |
| 2006/0056924 | A1 | 3/2006 | Jurkovich | |

FOREIGN PATENT DOCUMENTS

| | | |
|---|---|---|
| GB | 2106668 A | 4/1983 |

* cited by examiner

*Primary Examiner*—Gene Crawford
*Assistant Examiner*—William R Harp
(74) *Attorney, Agent, or Firm*—McNees Wallace & Nurick, LLC

(57) ABSTRACT

A system is provided for distributing particulate matter. The system includes at least two conduits, each conduit extending from a common first position adjacent a source of particulate matter to a second position. The pressure differential between the first and second positions is substantially the same for each conduit. A pressurized fluid conveys particulate matter through the at least two conduits. A device measures mass flow of particulate matter in each of the at least two conduits. A controller is in communication with the device that provides additional pressurized fluid to each conduit having a solids ratio greater than the desired solids ratio of the at least two conduits in response to a measured mass flow rate to balance (or to preferentially bias) mass flow of particulate matter through each of the at least two conduits.

18 Claims, 4 Drawing Sheets

PNEUMATIC UNEVEN FLOW FACTORING FOR PARTICULATE MATTER DISTRIBUTION SYSTEM

FIELD OF THE INVENTION

The present invention relates generally to distribution systems and, more particularly, to a particulate matter distribution system.

BACKGROUND OF THE INVENTION

Particulate matter distribution systems are generally associated with conveying a mass flow of finely rendered solid particles from a common source to multiple destinations, preferably providing equal amounts of the particulate matter to each destination. One method of conveying the particulate matter includes the provision of pressurized air. In one application, a pneumatic distribution system includes a number of pathways or conduits for continuously conveying finely pulverized coal to respective burners of a furnace, i.e., a coal fired furnace. A substantially balanced flow of coal particles is highly desirable, as an imbalanced flow of coal particle fuel to the burners can result in significant emissions of nitrogen oxides ($NO_x$) and carbon monoxide (CO), having adverse environmental consequences. In addition, the imbalance can produce a significant variation in the absorptions throughout the boiler surfaces located after the furnace. This imbalance causes additional steam temperature variations among the superheater and reheater tubes which can reduce the life cycle of the tube material and produce lower overall efficiencies.

However, continuously balanced particulate flow is extremely difficult to achieve, and conventional techniques employed not only fail to provide balanced particulate flow, but also decrease the efficiency of the conveyance system. For example, an approach to achieve balanced particulate flow is to provide pathways or conduits having an equal equivalent length. Equivalent length is defined as a factor which is applied in the calculation of the conduit pressure drop and represents the developed length of the conduit plus the length equivalent for bends, fittings, expansion/contraction of the conduit, etc. In addition to the equivalent length, the total pressure loss in the conduit is determined from a friction factor associated with the conduit internal surface, specific volume of the conveying fluid/particulate matter mixture, and the square of the total conduit mass flux and the conduit diameter, assuming the conduit is circular. The mass flux is the total mass of pressurized fluid and entrained particles which move across a surface that is perpendicular to the outer wall of the conduit.

Restrictors are introduced into conduits to provide the additional pressure loss necessary to achieve a balance in the pressure drop among all conduits when the mass flux is equal. The addition of restrictors has the same effect as the addition of bends etc. in that the addition of a restrictor changes the equivalent length of a conduit.

Applying either of the above techniques cannot achieve a balanced system, i.e., equal distribution of the solids mass flow within each conduit, in a continuous operating regime. Thus, an allowable margin is generally adopted for the acceptance of the final arrangement and this typically results in an imbalanced system, i.e., unequal and varying distribution of the solids mass flow within each conduit. Testing of the system for balance is normally performed with the pneumatic fluid only, at mass flows within the expected operating range and the velocities (or mass flow) measured in each conduit. Typically, a variation in velocity among the conduits of +/−5% of the mean velocity (or mass flow) is considered acceptable, but this variation can result in significant solids mass flow variations between pathways, of up to +/−40% of the mean mass flow. An imbalanced system, even at +/−5% of the mean pneumatic velocity (or mass flow), can have a significant negative impact on the operation of a process that relies on equal distribution of the solids mass flow within each conduit for optimum performance. For example, distribution of coal through conduits providing coal from a coal mill to burners in a coal fired boiler, as previously discussed.

In summary, existing techniques for balancing the flow of particulate matter (solids flow) within a number of conduits are inadequate and compromise the effectiveness or efficiency of the process in which they are installed.

What is needed is a technique that substantially balances the flow of particulate matter (solids flow) within a number of conduits that does not compromise the effectiveness or efficiency of the process in which it is installed.

SUMMARY OF THE INVENTION

The present invention relates to a system for distributing particulate matter. The system includes at least two conduits, each conduit extending from a common first position adjacent a source of particulate matter to a second position. The pressure differential between the first and second positions is substantially the same for each conduit. A pressurized fluid conveys particulate matter through the at least two conduits. A device measures mass flow of particulate matter in each of the at least two conduits. A controller is in communication with the device that provides additional pressurized fluid to each conduit having a solids ratio greater than the desired solids ratio of the at least two conduits in response to a measured mass flow rate to balance (or to preferentially bias) mass flow of particulate matter through each of the at least two conduits.

The present invention further relates to a method for providing increasingly uniform mass flow of particulate matter through each of at least two conduits. The steps of the method include providing at least two conduits, each conduit extending from a common first position adjacent a source of particulate matter to a second position. The method further includes the step of providing a pressurized fluid for conveying particulate matter through the at least two conduits, the pressure differential between the first and second positions being substantially the same for each conduit. The method further includes the step of measuring mass flow of particulate matter in each of the at least two conduits and then calculating a mean solids ratio of the at least two conduits. The method further includes the step of selectively providing additional pressurized fluid to each conduit having a solids ratio greater than the mean solids ratio of the at least two conduits.

An advantage of the present invention is that the flow of particulate matter (i.e., solids flow) within a number of conduits is substantially balanced.

A further advantage of the present invention is that the substantially balanced flow of particulate matter (i.e., solids flow) within the conduits is achieved without further compromising the effectiveness or efficiency of the process in which they are installed.

A still further advantage of the present invention is that flow control of particulate matter (i.e., solids flow) within the conduits is achievable under all load conditions in a simple closed loop control system.

A yet further advantage of the present invention is that a single pressurized fluid source or separate pressurized fluid source(s) can be employed to achieve flow control of particulate matter (i.e., solids flow) within the conduits.

A still yet further advantage of the present invention is that different pressurized fluids that are maintained at different temperatures can be employed to achieve flow control of particulate matter (i.e., solids flow) within the conduits.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention applies to a system and method for substantially balancing or equalizing the mass flow of fine solids or finely rendered particulate matter conveyed along two or more conduits by pressurized fluid. Each conduit extends from a common first position to a second position, the conduits defining separate pathways each having substantially equal pressure reductions between the first and second positions. It is to be understood that the size of particulate matter can vary, so long as the particulate matter is entrained (able) in the flow of the pressurized fluid, or at least is controllably movable within the conduits by the pressurized fluid. In one embodiment, the pressurized fluid for use in the system and method of the present invention is a gas, although it is possible for a proportion of the pressurized fluid to be a vapor.

It is to be understood that the terms solids, including the subscripted "s" for certain terms to be discussed below, and particulate matter as used herein can be used interchangeably.

Figure 1:
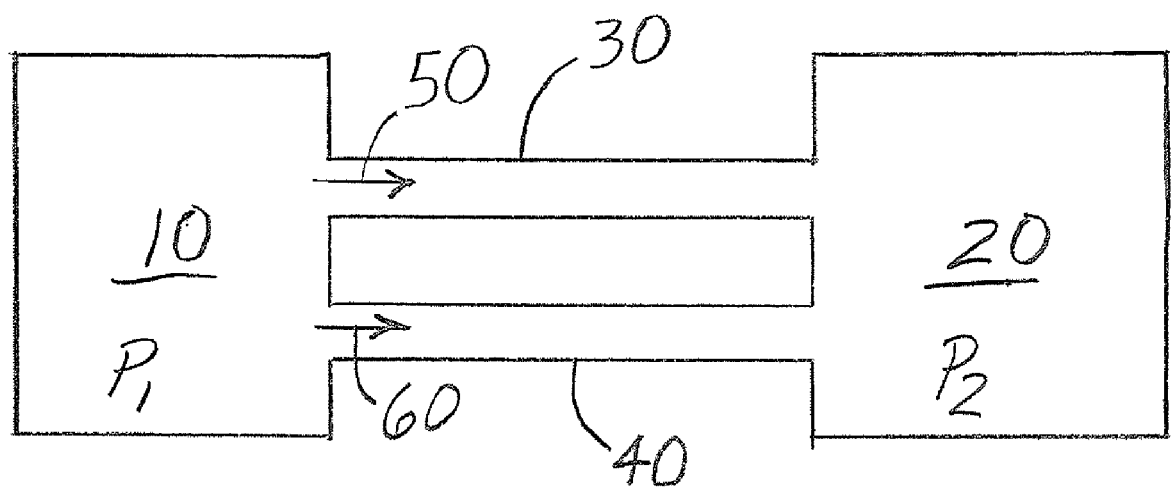
FIG. 1 is a schematic forming a basis for a mathematical model of the present invention.

The invention utilizes parameters as defined below to provide a balanced flow to the conduits. Referring to FIG. 1, a vessel 10 containing a mixture of a pressurized fluid (non-solids, such as gas and/or gas/vapor) and particulate matter (solids) (not shown) is connected to a second vessel 20 by a pair of separate conduits 30, 40. First vessel 10 is maintained at a higher pressure, $P_1$, than second vessel 20, $P_2$, so that a flow of pressurized fluid and particulate matter through conduit 30 is defined by flow direction 50 and a flow of pressurized fluid and particulate matter through conduit 40 is defined by flow direction 60. As shown, conduits 30, 40 are of equal diameter but do not necessarily have identical equivalent length ($L_e$).

Pressure Drop ($\Delta P$) for each conduit is the same, i.e., $P_1-P_2$

Pressure drop is a function of f, $L_e$, V, G, d, that is, $\Delta P \propto f^* L_e^* V^* G^2/d$ Where:
$\Delta P$ is the pressure drop;
$\propto$ signifies proportionality;
f is the conduit friction factor, equal for each conduit;
$L_e$ is the equivalent length of the conduit;
V is the specific volume of the solids/air mixture;
G is the mixture mass flux in the conduit, i.e., the mass flow divided by the cross sectional area;
d is the conduit diameter, equal for each conduit;

For this case, $\Delta P \propto [L_e]^*[V]^*[W]^2$

Where:
W is the mixture mass flow
V can be determined from $$V=([W_A^* V_A]+[W_S^* V_S])/(W_A+W_S)$$

Where:
$W_A$=mass flow of the conveying air (or the transport medium)
$V_A$=specific volume of the conveying air (or the transport medium)
$W_S$=mass flow of solids (for the material being conveyed)
$V_S$=specific volume of the solids, i.e., the reciprocal of the density (for the material being conveyed)
Setting the solids ratio, $SR=W_S/W_A$
Then $V=W_A^* V_A^*[1+SR^*(V_S/V_A)]/(W_A[1+SR])$ Substituting for V and noting $W=W_A^*[1+SR]$, and that $V_A$ is common to both conduits, the following is obtained:

$$L_e^*[1+SR^*(V_S/V_A)]^*[W_A]^{2*}[1+SR]^2/[1+SR]=\text{Constant; for each conduit} \quad [1]$$

In the application of pneumatic transport of finely pulverized coal particles $V_S<<V_A$, $(V_S/V_A)$ approaches zero and the term $SR^*(V_S/V_A)$ may be neglected.

This yields the following relationship for each conduit $$L_e^*[1+SR]^*(W_A)^2=\text{Constant} \quad [2]$$

It is to be understood that Equations (1) and (2) apply to any number of conduits arranged in parallel.

Mathematically, an infinite number of solutions for Equation (1) exist for a defined total flow of pressurized fluid and a total flow of particulate matter (solids) between vessels 10, 20. While there are numerous combinations of SR and $W_A$ which will satisfy Equation (1) and the conservation of pressurized fluid and particulate matter (solids) mass flows, those solutions where the values of SR are approximately balanced in each conduit exhibit the highest pressure drop. Furthermore, those solutions where the values of SR are not balanced in each conduit exhibit a lower pressure drop. This is a significant outcome which applies even with identical $L_e$s (equivalent lengths) for conduits 30 and 40 (as shown in FIG. 2).

Figure 2:
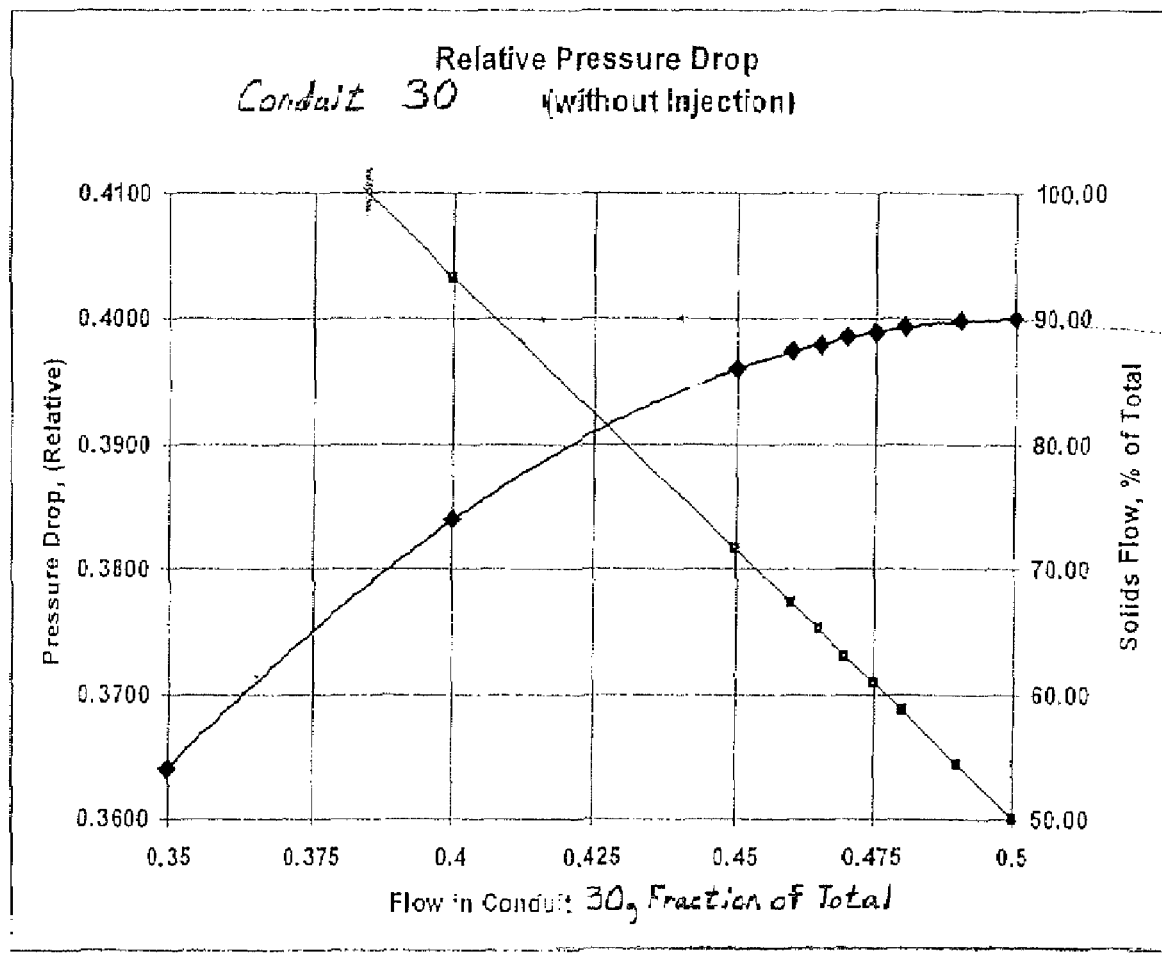
FIG. 2 is a chart showing fractional flow through a first conduit along the x-axis against both relative pressure drop and percentage flow of particulate matter (solids flow) out of total flow, each relative pressure drop and percentage flow of particulate matter along the y-axis, with respect to FIG. 1, without injection of additional pressurized fluid, according to an embodiment of the present invention.

FIG. 2 is a chart that shows several flow and pressure drop parameters with respect to conduit 30 of FIG. 1. For example, FIG. 2 shows possible solutions for pressure drop (see curve containing diamond shaped data points) between 0.35 and 0.5 of the total conveying pressurized fluid as a fraction of total flow through both of conduits 30, 40 of FIG. 1. It is to be understood that the mirror image of the same curve flipped about the y-axis position corresponding to 0.5 flow in conduit 30 shows the pressure drop for conduit 40. That is, conduit 40 has a conveying flow of 1 minus the fractional flow of conduit 30. Stated another way, the possible solutions for pressure drop for conduits 30 are identical to those for conduit 40.

The associated solids or particulate matter flow for each value of conveying flow is shown on the second y-axis as a percentage of the total solids or particulate matter flow (see curve containing square shaped data points in which the sides defining the squares are parallel to the x and y axes). A solids or particulate matter flow of 100% in conduit 30 is a limit for a real solution, since a negative flow of solids in conduit 40 is impossible. Thus, the practical limits for flow solutions for this case must be between conveying flows of approximately 0.38 to 0.62 in conduits 30 or 40. This is because the associated solids curve is symmetric about the x-axis, and that a conveying flow of approximately 0.62 would result in 0% solids flow.

As appreciated by those skilled in the art, for systems according to FIG. 2, any perturbation within the system, such as a slight change in flows or pressures, will cause the conduits 30, 40 to seek the lower pressure drop condition, (i.e., solutions where the values of SR are not balanced). This means that an equal distribution of solids or particulate matter mass flow in a static system is extremely difficult to sustain for extended periods of time, and efforts to manipulate the equivalent lengths in order to achieve a solids flow balance are neither effective, nor efficient.

With the addition of pressurized fluid into one conduit of unequal equivalent length to the other conduit, the balance of the solids flow in the conduits may be either an equal SR in each line or an equal solids mass flow in each line but not both. With a solids flow measurement on each line, the balancing of the solid flow may be made directly whereas the balancing of SR would require an additional measurement of the pressurized fluid flows. The balancing of solids flows is the preferred solution, as used in FIG. 3.

Figure 3:
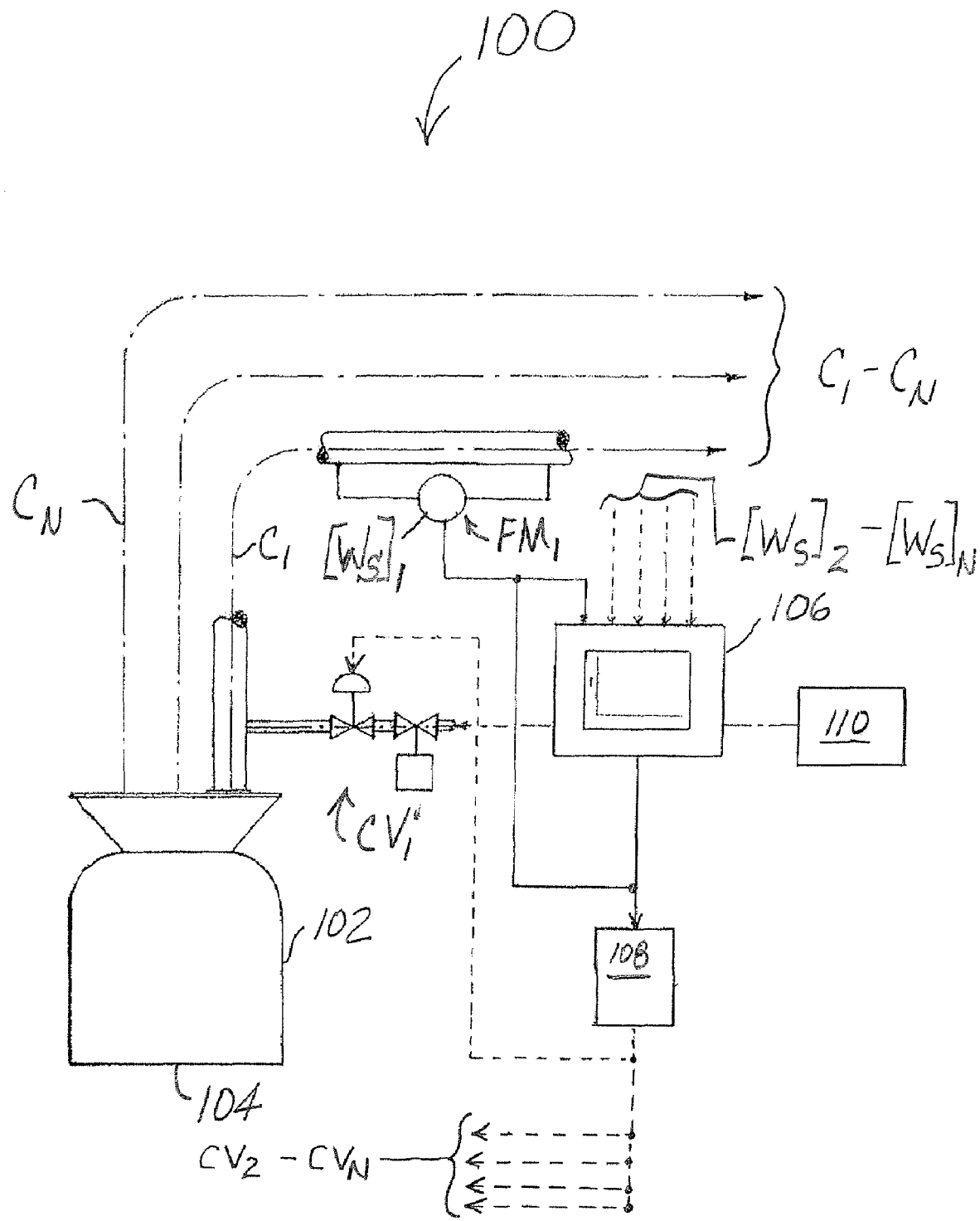
FIG. 3 is a schematic diagram of a particulate matter distribution system of the present invention.

FIG. 3 shows a schematic flow diagram of a distribution system 100 that includes a solids or particulate matter source 102 and a pressurized fluid source 104 for supplying a mixture of pressurized fluid (not shown) and solids or particulate matter (not shown) to each of conduits $C_1$ through $C_N$. A flow meter $FM_1$ is disposed between opposed ends of conduit $C_1$ to measure the flow rate of the solids or particulate matter $[W_S]_1$ flowing through conduit $C_1$. Flow meter $FM_1$ can be any type of flow meter suitable for the measurement of $[W_S]_1$ flowing through conduit $C_1$. Furthermore, the mass flow rate may be measured as the relative mass flow of particulate matter in each of the conduits or the absolute mass flow of particulate matter in each of the conduits.

In addition to flow meter $FM_1$ that measures $[W_S]_1$ flowing through conduit $C_1$, the remaining flow meters (not shown) measure respective flow rates $[W_S]_2$ through $[W_S]_N$ flowing through conduits $C_2$ through $C_N$. As shown in FIG. 3, the flow rates $[W_S]_2$ through $[W_S]_N$ as measured by the respective flow meters (only first flow meter $FM_1$ is shown in FIG. 3) are provided to a display device 106. Further, the flow rates $[W_S]_1$ through $[W_S]_N$ as measured by the respective flow meters are provided to controller 108. Where the solids or particulate matter flow rates differ between any of the conduits, necessarily at least one conduit has a solids (or particulate matter) flow rate that is greater than the mean SR. When this condition occurs, using first conduit $C_1$ as an example, the controller 108 modulates control of first control valve $CV_1$ to selectively control flow of an additional pressurized fluid from an additional pressurized fluid source 110 until $[W_S]_1$ is less than or equal to the mean SR. It is to be understood that controller 108 is similarly configured to selectively control other control valves, with a control valve associated with each of the other respective conduits. Since the pressure differential between all the conduits is maintained, in response to the introduction of additional pressurized fluid into a given conduit, the concentration of the solids or particulate matter flow in that conduit is lowered without the use of restrictors.

Although FIG. 3 shows pressurized fluid source 110 as being independent of pressurized fluid source 104, it is to be understood that the pressurized fluid sources can be a single pressurized source or that the pressurized fluids can be different media. It is also to be understood that the temperature of the pressurized fluids from pressurized fluid sources 104, 110 can be different.

In summary, distribution system 100 employs a dynamic system through the continuous measurement of solids or particulate mass flow in each conduit, combined with a feedback loop that introduces additional pressurized fluid flow from additional pressurized fluid source 110 into the conduits ($C_1$ through $C_N$) which exhibit values of SR that are greater than the mean SR value. This method of selective additional pressurized fluid into a conduit substantially balances the system, so that the solution, where the values are approximately balanced in each conduit, becomes the lowest pressure drop solution. The balancing of one system is demonstrated in FIG. 4.

Figure 4:
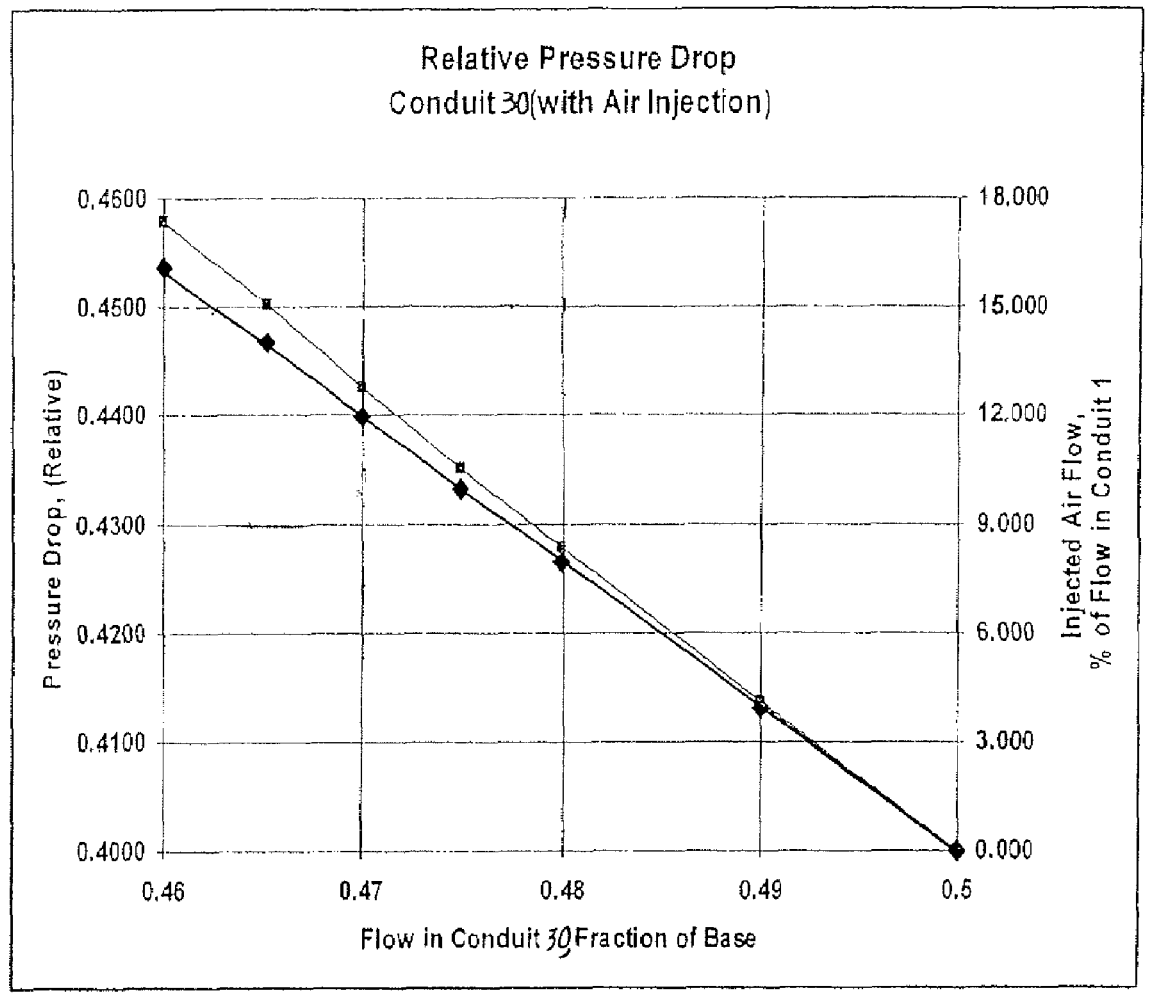
FIG. 4 is a chart showing fractional flow through a first conduit on the same basis as FIG. 2, prior to the injection of additional pressurized fluid, along the x-axis against both relative pressure drop, with the injected pressurized fluid, and the percentage flow of the injected pressurized fluid, along the y-axis, as required to achieve equal particulate matter (solids flow) in each conduit with respect to FIG. 1 in accordance to an embodiment of the present invention.

Conveying flows which would produce a variation of +/−40% in the solids flow for the system represented by FIG. 2, are between approximately 0.46 and 0.5 for conduit 30, and 0.5 to 0.54 for conduit 40. The relative pressure drop in the conduit is shown, in FIG. 4, by the diamond shaped points, while the corresponding additional pressurized fluid flow is denoted by square points having sides parallel to the x and y axes of FIG. 4. In one embodiment, as shown by FIG. 4, the temperature of the additional pressurized fluid is assumed to be substantially equal to that of the conveying pressurized fluid. In contrast to FIG. 2, in which pressure drop increases in a non-linear fashion as the solids flow in conduit 30 approaches 50% (i.e., approaches flow equal to that in conduit 40), the pressure drop decreases in a linear fashion as the additional pressurized fluid flow is reduced. The solids flow in conduit 30 for every point shown in FIG. 4 is 50% of the total solids flow.

It is to be understood that the quantity of additional pressurized fluid required to achieve a balance in the solids flow within each conduit will depend on the degree to which the equivalent length of the conduits varies from the mean. The anticipated average amount of additional pressurized fluid for those conduits with SR greater than the mean is estimated to be about 10% by weight of the conduit pressurized fluid flow. Thus, under these conditions, the amount of the total additional pressurized fluid introduced into the conduits of a multi-conduit system will be approximately 5% by weight of the total pressurized fluid flow used for conveying the solids for the system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Any multi conduit system transporting a two-phase flow where the relationship provided in Equation [1] is applicable, may be included in the scope of appended claims to achieve a balance (or any desired level of imbalance) of the material being transported by the carrier fluid.

What is claimed is:

1. A system for distributing particulate matter comprising:
at least two conduits, each conduit extending from a common first position adjacent a source of particulate matter to a second position, the pressure differential between the first and second positions being substantially the same for each conduit;
a pressurized fluid for conveying particulate matter through the at least two conduits;
a device for measuring a mass flow of particulate matter in each of the at least two conduits; and
a controller in communication with the device, the device further providing additional pressurized fluid to each conduit having a solids ratio greater than the desired solids ratio of the at least two conduits in response to the measured mass flow to balance or to preferentially bias the mass flow of particulate matter through each of the at least two conduits;
wherein the controller maintains each conduit by monitoring that each conduit satisfies the equation:

$$L_e*[1+SR*(V_S/V_A)]*[W_A]^2*[1+SR]^2/[1+SR]=Constant.$$

2. The system of claim 1 wherein the pressurized fluid and the additional pressurized fluid are provided from the same source of pressurized fluid.

3. The system of claim 1 wherein the pressurized fluid and the additional pressurized fluid are provided from different sources of pressurized fluid.

4. The system of claim 1 wherein the magnitude of pressure of the additional pressurized fluid is greater than the magnitude of the pressurized fluid.

5. The system of claim 1 wherein the temperature of the additional pressurized fluid is substantially the same as the temperature of the pressurized fluid.

6. The system of claim 1 wherein the temperature of the additional pressurized fluid is different from the temperature of the pressurized fluid.

7. The system of claim 1 wherein the device measures relative mass flow of particulate matter in each of the at least two conduits.

8. The system of claim 1 wherein the device measures absolute mass flow of particulate matter in each of the at least two conduits.

9. The system of claim 1 wherein the amount of the additional pressurized fluid provided to the at least two conduits is approximately 5% of the pressurized fluid for conveying particulate matter through the at least two conduits.

10. A method for providing increasingly uniform mass flow of particulate matter through each of at least two conduits, the steps comprising:
providing at least two conduits, each conduit extending from a common first position adjacent a source of particulate matter to a second position;
providing a pressurized fluid for conveying particulate matter through the at least two conduits, the pressure differential between the first and second positions being substantially the same for each conduit;
measuring mass flow of particulate matter in each of the at least two conduits;
calculating a mean solids ratio of the at least two conduits; and
selectively providing additional pressurized fluid to each conduit having a solids ratio greater than the mean solids ratio of the at least two conduits
wherein selectively providing additional pressurized fluid to each conduit having a solids ratio greater than the mean solids ratio of the at least two conduits satisfies the equation:

$$L_e*[1+SR*(V_S/V_A)]*[W_A]^2*[1+SR]^2/[1+SR]=Constant;$$

to quantify the amount of additional pressurized fluid.

11. The method of claim 10 the steps of providing a pressurized fluid and selectively providing additional pressurized fluid are provided from the same source of pressurized fluid.

12. The method of claim 10 the steps of providing a pressurized fluid and selectively providing additional pressurized fluid are provided from different sources of pressurized fluid.

13. The system of claim 10 wherein the magnitude of pressure of the additional pressurized fluid is greater than the magnitude of the pressurized fluid.

14. The system of claim 10 wherein the temperature of the additional pressurized fluid is substantially the same as the temperature of the pressurized fluid.

15. The system of claim 10 wherein the temperature of the additional pressurized fluid is different from the temperature of the pressurized fluid.

16. The system of claim 10 wherein the step of measuring mass flow is relative mass flow of particulate matter in each of the at least two conduits.

17. The system of claim 10 wherein the step of measuring mass flow is absolute mass flow of particulate matter in each of the at least two conduits.

18. The system of claim 10 wherein the amount of the additional pressurized fluid provided to the at least two conduits is approximately 5% of the pressurized fluid for conveying particulate matter through the at least two conduits.

* * * * *